Figure 1:
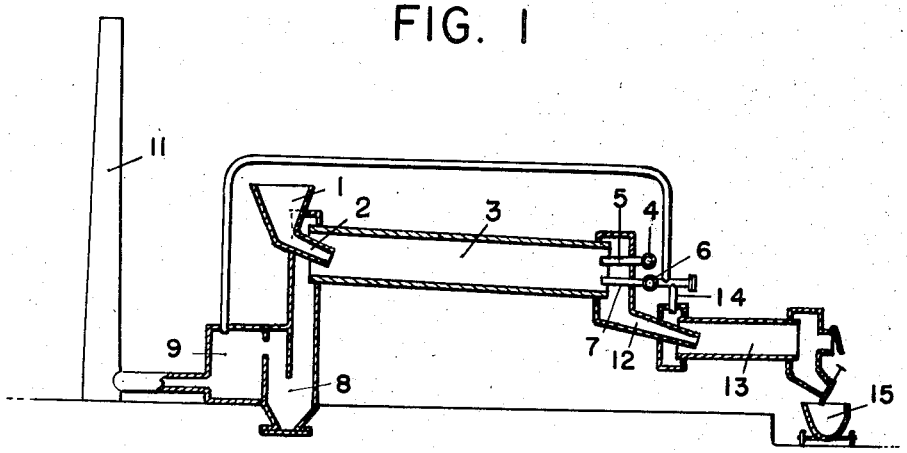

April 7, 1959

E. BIENECK ET AL 2,881,048

PROCESS FOR THE PRODUCTION OF MAGNESITE WHICH
IS POOR IN SILICA OR SILICA-FREE

Filed Oct. 29, 1954

INVENTORS
EDMUND BIENECK &
ERICH SCHROTH

BY

ATTORNEYS

2,881,048
PROCESS FOR THE PRODUCTION OF MAGNESITE WHICH IS POOR IN SILICA OR SILICA-FREE

Edmund Bieneck and Erich Schroth, Wiesbaden, Germany, assignors to Didier-Werke A.G., Wiesbaden, Germany Application October 29, 1954, Serial No. 465,673

Claims priority, application Germany October 31, 1953

4 Claims. (Cl. 23—67)

Crude magnesite frequently comprises, in addition to the principal ingredient $MgCO_3$, various impurities which prejudice the value of sinter magnesite or of refractory bricks and masses prepared from such raw material. The silica contained in the crude magnesite, usually in the form of quartz inclusions, in particular exerts an unfavorable influence. Consequently, crude magnesite with a high silica content can be used only to a limited extent or not at all for the production of good magnesite bricks or blocks. It is therefore necessary, when mining the crude material at the quarry, to sort the same into useful magnesite with low silica content and non-useful magnesite with high silica content. Since, however, the latter occurs in relatively large quantities, waste piles accumulate, and the necessary sorting and the frequently low yields increase the costs of production.

The present invention relates to a process for reducing the silica content of crude magnesites by the elimination of silica therefrom. This process makes it possible to convert crude magnesites with high silica content, which could not heretofore be used for the production of good magnesite brick, into a form which is useful for the manufacture of such brick or blocks.

Although it has heretofore been possible to use only crude magnesites which in the raw state contain about 1.5% by weight of silica for the production of sinter magnesite suitable for the making of good magnesite brick, the present invention makes it possible also to use for the said purpose crude magnesites which, in the crude state, contain 2.5% by weight or more of silica. The present invention makes it possible to prepare a sinter magnesite with 2% by weight or less of silica from a crude magnesite with 4% or more of silica, calculated relative to the fined material.

In accordance with the invention, the raw magnesite coming from the quarry is subjected—without preliminary chemical or thermal pretreatment and only, if necessary, with comminution to a suitable particle or grain size—to the action of high-temperature heat whereby it is suddenly, i.e. substantially instantaneously, heated to a temperature which is somewhat above the temperature of conversion of β-quartz into α-quartz. Since this conversion temperature is at 575° C., at least this temperature or preferably a somewhat higher temperature, for example 600 to 800° C., has to be imparted to the crude magnesite in order that the mass of particles or grains may suddenly attain the minimum temperature of 575° C. If, according to this invention, the crude magnesite particles or grains are thus suddenly brought to the said conversion temperature, the quartz conversion, and the increase in volume bound up therewith, takes place explosively. This results in a bursting of the quartz grains and, simultaneously therewith, also of the crude magnesite particles in which the quartz grains are embedded. By correlating the temperature of the heating gases and the grain size of the crude magnesite, the sudden heating may be realized in the entire mass of the magnesite grains, or at least in the greater portion thereof. The crude magnesite particles are thus changed into a powder which comprises the converted quartz in particularly fine dust form. This quartz dust is then separated from the pulverized magnesite mass so that only a small proportion of quartz remains in the latter.

The magnesite which is thus at least partially freed of quartz is then fired in per se conventional manner at elevated temperatures to form sinter magnesite which constitutes the starting material for the production of magnesite brick or blocks.

According to a further phase of the invention, the fine quartz dust can be removed from the powdered magnesite by the heating gases which may be used for directly heating the crude magnesite, as hereinbefore set forth. If the heating gases are passed through or over the powdered mass, the gases take up the fine and light quartz dust and carry the same away. The quartz dust thus entrained by the heating gases can be separated from the latter in suitable and per se conventional manner exteriorly of the heating chamber. The magnesite dust, which is heavier than the quartz dust and which is formed in addition to the still heavier magnesite grains, is not entrained by the heating gases. The explosive shattering of the magnesite particles and of the quartz granules disseminates the resultant dust through the heating gas so that the latter is entirely permeated by dust. It therefore carries along with it the entrainable fine dust which does not have an opportunity, in the short period of time in which the heating gas dwells in the heating chamber or in that portion thereof wherein the explosive shattering of the magnesite takes place, to settle out.

The crude magnesite which is subjected to the sudden heating may be in particulate form. The smaller the particle size, the stronger is the shattering and all the quartz particles are subjected to the sudden heating so that practically the entire quantity of quartz can be eliminated.

The sudden heating can be produced by direct or indirect heating of the crude magnesite. Thus the magnesite can be introduced, for example poured, into an exteriorly heated furnace chamber in which a temperature above that necessary for the sudden quartz conversion is constantly maintained. In other words, the finely divided magnesite is thus substantially instantaneously heated from ambient temperature (for example about 20–30° C. or so) to a temperature well above the aforesaid quartz conversion temperature. The quartz dust which results from the ensuing explosive bursting of the crude magnesite particles—which, as indicated, are here preferably in the form of small grains—drops together with the pulverized magnesite down to the bottom of the chamber. The quartz dust is then separated from this mixture and the magnesite can be further fired, for example in an adjacent or entirely separate highly heated chamber, or the magnesite may be used for any other desired purpose; for example, it may be ground and used as a binding agent for synthetic brick or blocks of various composition, including also magnesite blocks.

The heating of the crude magnesite in an exteriorly heated furnace chamber can be supplemented by passing a hot gas, such for example as combustion gas, waste gas, or the like, into or through the said chamber. This additional gas, the temperature of which should not be below that of the furnace chamber and preferably should be somewhat higher, supplies supplemental heat to the crude magnesite particles. Moreover, it picks up the fine quartz dust and carries it along therewith when it leaves the furnace chamber and thus separates the quartz from the magnesite.

However, it is also possible to obtain the necessary temperature solely from hot gases passed through the furnace chamber, that is solely by direct contact of the crude magnesite with hot gases. With this type of heating, the process is particularly advantageously carried out with per se conventional rotary tube furnaces with direct heating of the treated moving material by means of heating gases which flow in countercurrent to such material. When resorting to this expedient in carrying out the present invention, the countercurrent-flowing hot gases must, at their point of initial contact with the oppositely moving magnesite particles be at such a temperature that the contacted crude magnesite is suddenly brought to a temperature of at least 575° C.

The speed of movement of the material in the furnace and the temperature of the heating gases are so correlated that the sudden action of the requisite high temperature on the material takes place along a very short extent of the furnace directly at the inlet of the magnesite so that an explosive bursting of the latter and of the quartz embedded therein is realized. The hot gases forcibly entrain the light quartz dust therewith and transport the latter out of the furnace. In this way there remains in the furnace only the magnesite which has been wholly or partly freed of quartz and which then continues to move further into and through a sinter zone wherein it is filtered and thus converted into silica-poor or silica-free sinter magnesite which can be employed for the manufacture of high grade magnesite bricks or blocks. The quartz dust can be removed from the heating gases after the latter have left the furnace, for example by introducing the said gases into settling chambers, by the action of centrifugal separators, by electrical precipitation, etc.

It is known to calcine crude magnesite in a rotary tube furnace and to fire it into the form of sinter magnesite. The oven generally used for this purpose is so arranged that the crude magnesite, in its travel through the furnace, is gradually raised from the lowest temperature up to the sintering temperature. In order to completely utilize the heat of the heating gas, the furnace is usually very long and the heating gas is only moderately hot, generally not above 250° C., when it encounters the crude magnesite. Accordingly the latter comes into contact with hot gases which, at most, have a temperature of 250° C. and are gradually heated to quartz conversion temperature only after a long period of travel. However, such slow heating does not give rise to an explosive bursting of the material, and the quartz remains included therein although in converted form. The converted quartz is not separated from the magnesite, as is the case when proceeding according to the present invention.

Figure 2:
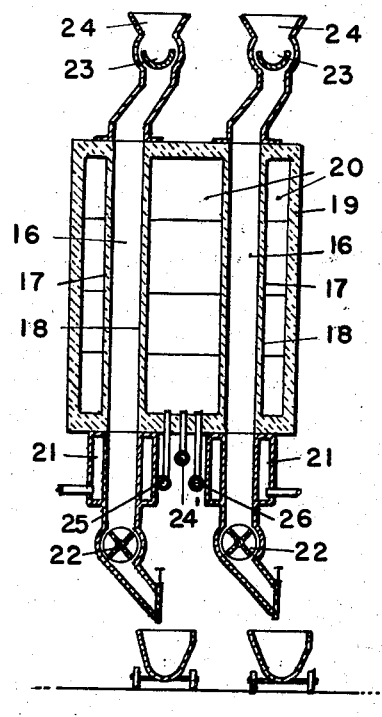

Illustrative installations for carrying out the present invention are shown, diagrammatically and solely by way of example, on the accompanying sheet of drawings, wherein Fig. 1 is a diagrammatic representation of a rotary tube furnace wherein the crude magnesite is subjected to the sudden heating according to this invention, by direct contact with hot gases; and Fig. 2 is a similar representation of a chamber type oven, in the chambers of which the crude magnesite is suddenly heated, according to this invention, by heat passing through the heating walls.

In the arrangement according to Fig. 1, the crude magnesite, in lumps or particles having a diameter up to 10 cm., enters the rotary tube furnace 3 via the outlet 2 of the supply hopper 1. The thus-supplied magnesite comes into contact with the hot gases which are produced at the other end of the rotary tube 3 by the combustion of heating gas, e.g. illuminating gas or the like, the latter being supplied via the gas supply and inlet tubes 4 and 5, the air requisite to the combustion being introduced via the air supply and inlet tubes 6 and 7. The air is preferably preheated, and suitable ignition means (per se conventional in construction) are provided. The combustion gases move through the furnace (to the left in Fig. 1), the rate of speed being such that the temperature of the gases as they come into contact with the magnesite dropping into the furnace at 2, is at about 700° C. As the magnesite lumps or particles thus encounter the hot gases, the magnesite is suddenly, i.e. substantially instantaneously, raised to a temperature of at least 575° C. As a result of this sudden rise in temperature, said lumps and/or particles burst, essentially explosively, into small particles of a diameter of about 1 cm. or less down to dust-like particles.

The dust-fine particles are carried along by the flowing hot gases into the dust-precipitating chamber 8 wherein the dust settles out. The dust which thus accumulates in chamber 8 is removed therefrom from time to time, as necessary. Chamber 8 leads to a heat-exchange device or recuperator 9, by virtue of which the heat of the discharging hot gases is used to preheat the air used in the combustion at the other end of the furnace 3. The cooled combustion gases leave via chimney 11.

Due to the inclination of the furnace tube 3, the magnesite entering at 2 moves toward the other (right-hand, on the drawing) end of the furnace tube and thus comes progressively into contact with gases of increasingly high temperature whereby the silica-free or silica-poor material is converted into sintered magnesite. The resultant highly-heated sintered magnesite is discharged from the rotary tube furnace 3 through the discharge conduit 12 into a cooling drum 13. In the latter, the sintered material is cooled by means of cold air introduced at the far end of the drum. The resultant heated air passes through conduit 14 into the combustion air supply conduit 6. The sintered magnesite is continuously removed from the cooling drum into a movable receptacle or car or the like. The operation of the apparatus is thus a continuous one.

According to Fig. 2, the crude magnesite is supplied to narrow, rectangular chambers 16 defined by walls 17 and 18 and by similar front and rear walls (not shown). The chambers 16 are encompassed by a jacket 19 in which heating ducts 20 are provided. The walls and jacket are of refractory material. At the lower ends of the chambers 16, just beyond the jacket 19, cooling chambers 21—the walls of which are made of good heat-conducting material, e.g. metal—are provided. Chambers 21 are preferably of double-walled construction, as shown, and the interior of each cooling chamber is in effect an extension of its associated chamber 16. In the hollow space between the walls of the cooling chambers, cooling air flows. Each cooling chamber is provided with a mechanical discharge device 22 for the cooled material. At the top of each chamber 16, a mechanical feeder is arranged. The discharge devices and feeders may be of any per se known and suitable construction. The magnesite to be treated flows from the supply hoppers 24 to the respective chambers 16 via the feeders 23.

The chambers 16 are indirectly heated to such a temperature that the material dropping from the feeders 23 is suddenly, i.e. substantially instantaneously, heated to at least 575° C. It is preferred that the temperature at the top of chambers 16 be at no time below about 700°. The column of magnesite particles which builds up in each chamber 16 is slowly discharged at the lower end of the chamber via the cooling chamber 21 and discharger 22, so that fresh material is constantly added to the upper end of the column. The chambers 16 are preferably relatively short and the speed of passage of the material therethrough relatively rapid so that no opportunity is afforded for a heating of the magnesite above about 575° C.

Heat is supplied to chambers 16 indirectly through the walls 17 and 18. These walls are heated by combustion gases resulting from the combustion of heating gas, e.g. illuminating gas or the like, at the bottom of the jacket 19. To this end fuel gas supply conduit 24, and air supply conduits 25 and 26 are provided, as shown, together with suitable and conventional ignition means (not illustrated). Preheated air, from coolers 21, is supplied to conduits 25 and 26, or either or both of the latter may be provided with air preheated by heat exchange with the waste gases from the jacket 19 in a suitable heat exchanger (not shown).

The following is described by way of further illustrative exemplification:

In either type of furnace, aforedescribed, the crude magnesite is supplied in lumps and particles having a diameter up to about 10 cm. The temperature in the furnace at the point of introduction of the crude magnesite is about 700° C.; it should in no event drop below 600° C. The introduced lumps and particles explode, i.e. burst forthwith, and split into smaller pieces having a diameter up to about 1 cm. This splitting, as aforesaid, is a sudden one. Some of the material breaks down into dust. The splitting of the crude magnesite pieces takes place at those points where the pieces are rich in quartz. The coarse particles of crude magnesite break down into particles of greater or smaller diameter, within the aforesaid general limits. In the fine granules, which are derived predominately from those points in the crude magnesite where quartz was included, the proportion of quartz is considerably higher than the proportion of quartz in the initial material. The coarser granules, which are derived from those portions of the crude magnesite parts which contained no quartz inclusions or only a small quantity thereof, contain a smaller proportion of quartz than was contained in the original crude magnesite. The fine granules, generally speaking, are of a size less than 0.12 mm. in diameter. Coarser granules have a diameter up to 10 mm. or more. The two types of granules may be sorted according to size and the coarser granules will contain much less quartz than the initial material, while the fine granules will contain considerably more quartz than the initial material. Thus, a crude magnesite containing 4.9% by weight of $SiO_2$ in the crude material (calculated relative to the calcined substance), provides after being subjected to sudden heating to at least 575° C., according to the present invention, a coarse grained fraction with an $SiO_2$ content of 1.5% by weight and a fine grained fraction with an $SiO_2$ content of about 10%. By separating the fine grains from the coarse grains, there is obtained a heat treated material with a sharply (60%) decreased quartz content, i.e. the $SiO_2$ content in the treated material amounts to about 30% or less of the quartz content of the original material. Since the fine grains have a granular size of no more than above 0.12 mm. diameter, they are readily entrained by a current of gas. Thus gas moving at a speed of about 4 meters per second at a temperature of 700° C. will entrain particles up to 0.7 mm. The removal of the fine grained material thus does not require any more than a small flow speed of heating gas.

Having thus disclosed the invention, what is claimed is:

1. A process which comprises heating particles of comminuted quartz-containing crude magnesite substantially instantaneously from room temperature to a temperature of at least 575° C., whereby explosive separation of said particles occurs together with explosive disintegration of the quartz, and forthwith removing the resultant quartz powder from the magnesite.

2. A process as claimed in claim 1, wherein the crude magnesite is suddenly introduced into an externally heated zone maintained at a temperature of at least 575° C.

3. Process according to claim 2, wherein an auxiliary heating and quartz powder-entraining gas at a temperature of at least 575° C. is passed through the heating zone.

4. A process according to claim 1 wherein the crude magnesite is heated to the temperature of at least 575° C. by being brought into sudden direct contact with a heating gas at a temperature above 575° C.

References Cited in the file of this patent

UNITED STATES PATENTS

| 734,240 | Propfe | July 21, 1903 |
|---|---|---|
| 1,311,645 | Foss | July 29, 1919 |
| 1,679,857 | France | Aug. 7, 1928 |
| 1,872,512 | Seaton | Aug. 16, 1932 |
| 1,947,952 | Nitzschke | Feb. 20, 1934 |
| 2,363,282 | Arnold | Nov. 21, 1944 |
| 2,414,980 | Schoenlaub | Jan. 28, 1947 |

FOREIGN PATENTS

| 4,882 | Great Britain | 1880 |